US010554795B2

(12) United States Patent
Dong et al.

(10) Patent No.: US 10,554,795 B2
(45) Date of Patent: Feb. 4, 2020

(54) UPLINK TRANSMISSION METHOD, RELATED DEVICE, AND SYSTEM

(71) Applicant: Huawei Technologies Co., Ltd., Shenzhen, Guangdong (CN)

(72) Inventors: Chen Dong, Beijing (CN); Tong Jiang, Beijing (CN); Qiang Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/119,467

(22) Filed: Aug. 31, 2018

(65) Prior Publication Data
US 2019/0020744 A1 Jan. 17, 2019

Related U.S. Application Data

(63) Continuation of application No. PCT/CN2016/075363, filed on Mar. 2, 2016.

(51) Int. Cl.
*H04B 10/116* (2013.01)
*H04L 29/08* (2006.01)
*H04L 29/06* (2006.01)

(52) U.S. Cl.
CPC .......... *H04L 69/324* (2013.01); *H04B 10/116* (2013.01); *H04L 69/22* (2013.01)

(58) Field of Classification Search
CPC .................................................... H04B 10/116
See application file for complete search history.

(56) References Cited

U.S. PATENT DOCUMENTS 5,706,466 A * 1/1998 Dockser ................ G06F 9/3802
711/125
2002/0136203 A1* 9/2002 Liva ...................... H04B 10/272
370/352

(Continued)

FOREIGN PATENT DOCUMENTS

CN 102484885 A 5/2012
CN 102577180 A 7/2012

(Continued)

OTHER PUBLICATIONS

Li Qiang, Jiang Tong, Dong Chen (Huawei), General considerations and proposals for high rate PD communications, IEEE 802.15-16/0028r1, IEEE, Internet URL:https://mentor.ieee.org/802.15/dcn/16/15-16-0028-01-007a-general-considerations-and-proposals-for-high-rate-pd-communications.pptx>, Jan. 10, 2016, total 16 pages.

(Continued)

*Primary Examiner* — Shi K Li
(74) *Attorney, Agent, or Firm* — Womble Bond Dickinson (US) LLP

(57) ABSTRACT

The present application discloses an uplink transmission method, including: generating, by a media access control (MAC) layer of a first device, MAC information, then generating a first primitive carrying the MAC information, and sending the first primitive to an adjacent higher layer of the MAC layer of the first device; receiving, by the adjacent higher layer of the MAC layer of the first device, the first primitive, then generating an adjacent higher layer message carrying the MAC information, and sending the adjacent higher layer message to an adjacent higher layer of a MAC layer of a second device; and receiving, by the adjacent higher layer of the MAC layer of the second device, the adjacent higher layer message, then generating a second (Continued)

primitive carrying the MAC information, and sending the second primitive to the MAC layer of the second device.

11 Claims, 10 Drawing Sheets

(56) References Cited

U.S. PATENT DOCUMENTS

| | | |
|---|---|---|
| 2011/0044218 A1* | 2/2011 | Kaur .................... H04W 76/16 370/310 |
| 2011/0069962 A1 | 3/2011 | Castor et al. |
| 2014/0010550 A1 | 1/2014 | Bahr et al. |
| 2014/0192714 A1 | 7/2014 | Cordeiro et al. |
| 2015/0019717 A1* | 1/2015 | Li ....................... H04L 67/1085 709/224 |
| 2015/0263880 A1 | 9/2015 | Wang et al. |
| 2017/0054500 A1 | 2/2017 | Rong |

FOREIGN PATENT DOCUMENTS

| | | |
|---|---|---|
| CN | 103503338 A | 1/2014 |
| CN | 103729898 A | 4/2014 |
| CN | 103748953 A | 4/2014 |
| EP | 2563088 A1 | 2/2013 |
| JP | 2004032035 A | 1/2004 |
| JP | 2013502850 A | 1/2013 |
| WO | 2015168842 A1 | 11/2015 |

OTHER PUBLICATIONS

Li Qiang, Hybrid VLC and RF heterogeneous network for indoor applications, IEEE 802.15-16/0174r0, IEEE, Internet URL:https://mentor.ieee.org/802.15/dcn/16/15-16-0174-00-007a-hybrid-vlc-and-rf-heterogeneous-network-for-indoor-applications.pplx>, Mar. 7, 2016, total 14 pages.

* cited by examiner

UPLINK TRANSMISSION METHOD, RELATED DEVICE, AND SYSTEM

CROSS-REFERENCE TO RELATED APPLICATIONS

This application is a continuation of International Application No. PCT/CN2016/075363, filed on Mar. 2, 2016, the disclosure of which is hereby incorporated by reference in its entirety.

TECHNICAL FIELD

The present application relates to the field of communications technologies, and in particular, to an uplink transmission method, a related device, and a system.

BACKGROUND

Visible light communication (VLC) is a communication manner in which an electromagnetic wave within a range of a visible light frequency band is used as a transmission medium for communication. In recent years, the VLC communication has been attached with importance in academia and industry because of particularities of a frequency band used for the VLC (for example, (1) the VLC is in a relatively wide frequency spectrum from 430 THz to 750 THz, and this frequency band can be used without a license; (2) infrastructures are widely distributed; (3) the VLC is eco-friendly with no electromagnetic pollution; (4) the VLC is safe to human body; and (5) the VLC has a confidential security function because information transmission in the VLC has to be limited only at a location that can be illuminated by light).

Currently, in a VLC communication technology, there are the following problems in an uplink transmission process from a terminal (such as a smartphone or a tablet computer) to a VLC access point (AP): (1) user experience is poor because uplink transmission from the terminal to the VLC AP needs to be performed by a light emitting device of the terminal, and terminal use by a user is affected when the light emitting device is turned on; (2) power consumption is relatively large because when the light emitting device is turned on, power of the terminal needs to be consumed, and the power consumption of the terminal increases then; (3) a link may be blocked because an obstacle such as a wall or a door cannot be passed through during VLC transmission, and a range and a distance of the VLC transmission are limited; and (4) there is a hidden node in uplink transmission because transmission of light is directional. When a terminal performs uplink transmission to a VLC AP, another terminal in a coverage area of the VLC AP cannot detect the uplink transmission performed by the terminal, that is, the terminals are hidden nodes to each other. Therefore, when a current terminal is performing uplink transmission, if another terminal also sends data to the VLC AP, a collision occurs, thereby affecting network throughput.

To resolve the foregoing problems, it is proposed a heterogeneous network on which a VLC link is used for down transmission and an RF link is used for uplink transmission, for example, Wi-Fi, ZigBee, IR, Bluetooth, LTE, and GSM are used for uplink transmission. Replacing a VLC link with an RF link to perform uplink transmission can better avoid the foregoing problems in VLC uplink transmission, in an uplink transmission process of VLC MAC information (such as an acknowledgment (ACK) frame or a command frame). However, at a transmit end, a VLC media access control (MAC) layer needs to send, by using a primitive, the VLC MAC information to an adjacent higher layer first, and then, at a receive end, an adjacent higher layer needs to send, by using a primitive, the VLC MAC information to a VLC MAC layer. Interaction between adjacent protocol layers in a protocol stack needs to be implemented by using primitives, and each primitive has a fixed function. After a primitive is defined and prescribed in a standard, a primitive name, a primitive type, a primitive parameter, a primitive function, an occasion in which the primitive is generated, and an action after the primitive is received are in a one-to-one correspondence with the primitive. Among primitives that have been prescribed in the existing IEEE 802.15.7 standard, no primitive can implement the foregoing function of correctly exchanging, between a VLC MAC layer and an adjacent higher layer of the VLC MAC layer, an ACK frame and a command frame that are generated by the VLC MAC layer; therefore, according to the existing standard, when uplink transmission is performed on a heterogeneous network, a transmit end device cannot correctly and effectively send VLC MAC information to a receive end device by using another link.

SUMMARY

Embodiments of the present application provide an uplink transmission method, to resolve a problem that when uplink transmission is performed on a heterogeneous network, a transmit end device cannot correctly and effectively send VLC MAC information to a receive end device by using another link.

A first aspect of the embodiments of the present application provides an uplink transmission method, including:

generating, by a MAC layer of a first device, MAC information, then generating a first primitive carrying the MAC information, and sending the first primitive to an adjacent higher layer of the MAC layer of the first device; receiving, by the adjacent higher layer of the MAC layer of the first device, the first primitive, then generating an adjacent higher layer message carrying the MAC information, and sending the foregoing adjacent higher layer message to an adjacent higher layer of a MAC layer of a second device; and receiving, by the adjacent higher layer of the MAC layer of the second device, the foregoing adjacent higher layer message, then generating a second primitive carrying the MAC information, and sending the second primitive to the MAC layer of the second device, thereby resolving a problem that when uplink transmission is performed on a heterogeneous network, a transmit end device cannot correctly and effectively send VLC MAC information to a receive end device by using another link.

With reference to the first aspect of the embodiments of the present application, in a first possible implementation of the first aspect, the MAC information includes an ACK frame or a command frame generated by the MAC layer of the first device.

With reference to the first aspect of the embodiments of the present application or the first possible implementation of the first aspect, in a second possible implementation of the first aspect, the first primitive further carries address information of the second device. The address information of the second device is used by the second device to determine that the foregoing MAC information needs to be sent to a VLC MAC layer (but not a PLC MAC layer) of the second device. In this way, uncertainty of a processing action performed by the adjacent higher layer of the MAC layer of the second device can be avoided.

With reference to any one of the first aspect of the embodiments of the present application, or the first or the second possible implementation of the first aspect, in a third possible implementation of the first aspect, the second primitive further carries address information of the first device. The address information of the first device is used by the second device to determine a sending body of the foregoing MAC information, so as to avoid faulty processing or inefficient processing performed by the second device due to uncertainty of the sending body.

With reference to any one of the first aspect of the embodiments of the present application, or the first to the third possible implementations of the first aspect, in a fourth possible implementation of the first aspect, a specific implementation of the sending, by the adjacent higher layer of the MAC layer of the first device, the adjacent higher layer message to an adjacent higher layer of a MAC layer of the second device is as follows:

sending, by the adjacent higher layer of the MAC layer of the first device, the foregoing adjacent higher layer message to the adjacent higher layer of the MAC layer of the second device by using a designated link, where the designated link includes a wired link, an RF link, an IR link, a wired link and an RF link, or a wired link and an IR link.

With reference to the first aspect of the embodiments of the present application, and the first to the fourth possible implementations of the first aspect, in a fifth possible implementation of the first aspect, the adjacent higher layer of the MAC layer of the first device returns a MAC layer data response primitive to the MAC layer of the first device after the adjacent higher layer of the MAC layer of the first device receives the first primitive.

With reference to the first aspect of the embodiments of the present application, and the first to the fifth possible implementations of the first aspect, in a sixth possible implementation of the first aspect, the MAC layer of the second device returns a MAC layer data acknowledgment primitive to the adjacent higher layer of the MAC layer of the second device after the adjacent higher layer of the MAC layer of the second device sends the foregoing second primitive to the MAC layer of the second device.

A second aspect of the embodiments of the present application provides an uplink transmission method, including:

generating, by a MAC layer of a first device, MAC information, then generating a first primitive carrying the MAC information, and sending the first primitive to an adjacent higher layer of the MAC layer of the first device; and receiving, by the adjacent higher layer of the MAC layer of the first device, the first primitive, then generating an adjacent higher layer message carrying the MAC information, and sending the foregoing adjacent higher layer message to an adjacent higher layer of a MAC layer of a second device, where the foregoing adjacent higher layer message is used to instruct the adjacent higher layer of the MAC layer of the second device to send, by using a second primitive, the MAC information to the MAC layer of the second device, thereby resolving a problem that when uplink transmission is performed on a heterogeneous network, a transmit end device cannot correctly and effectively send VLC MAC information to a receive end device by using another link.

With reference to the second aspect of the embodiments of the present application, in a first possible implementation of the second aspect, the MAC information includes an acknowledgment ACK frame or a command frame generated by the MAC layer of the first device.

With reference to the second aspect of the embodiments of the present application or the first possible implementation of the second aspect, in a second possible implementation of the second aspect, the first primitive further carries address information of the second device. The address information of the second device is used by the second device to determine that the foregoing MAC information needs to be sent to a VLC MAC layer (but not a PLC MAC layer) of the second device. In this way, uncertainty of a processing action performed by the adjacent higher layer of the MAC layer of the second device can be avoided.

With reference to any one of the second aspect of the embodiments of the present application, or the first or the second possible implementation of the second aspect, in a third possible implementation of the second aspect, the second primitive further carries address information of the first device. The address information of the first device is used by the second device to determine a sending body of the foregoing MAC information, so as to avoid faulty processing or inefficient processing performed by the second device due to uncertainty of the sending body.

With reference to any one of the second aspect of the embodiments of the present application, or the first to the third possible implementations of the second aspect, in a fourth possible implementation of the second aspect, a specific implementation of the sending, by the adjacent higher layer of the MAC layer of the first device, the foregoing adjacent higher layer message to an adjacent higher layer of a MAC layer of the second device is as follows: sending, by the adjacent higher layer of the MAC layer of the first device, the foregoing adjacent higher layer message to the adjacent higher layer of the MAC layer of the second device by using a designated link, where the designated link includes a wired link, an RF link, an IR link, a wired link and an RF link, or a wired link and an IR link.

A third aspect of the embodiments of the present application provides an uplink transmission method, including:

receiving, by an adjacent higher layer of a MAC layer of a second device, an adjacent higher layer message sent by an adjacent higher layer of a MAC layer of a first device, where the foregoing adjacent higher layer message is a message that is generated by the adjacent higher layer of the MAC layer of the first device after the adjacent higher layer of the MAC layer of the first device receives a first primitive and that carries MAC information; and generating, by the adjacent higher layer of the MAC layer of the second device, a second primitive carrying the MAC information, and sending the second primitive to the MAC layer of the second device, thereby resolving a problem that when uplink transmission is performed on a heterogeneous network, a transmit end device cannot correctly and effectively send VLC MAC information to a receive end device by using another link.

With reference to the third aspect of the embodiments of the present application, in a first possible implementation of the third aspect, the first primitive further carries address information of the second device. The address information of the second device is used by the second device to determine that the foregoing MAC information needs to be sent to a VLC MAC layer (but not a PLC MAC layer) of the second device. In this way, uncertainty of a processing action performed by the adjacent higher layer of the MAC layer of the second device can be avoided.

With reference to the third aspect of the embodiments of the present application, or the first possible implementation of the third aspect, in a second possible implementation of the third aspect, the second primitive further carries address information of the first device. The address information of the first device is used by the second device to determine a sending body of the foregoing MAC information, so as to avoid faulty processing or inefficient processing performed by the second device due to uncertainty of the sending body.

A fourth aspect of the embodiments of the present application provides a device, including a module configured to perform the method according to the second aspect.

A fifth aspect of the embodiments of the present application provides a device, including a module configured to perform the method according to the third aspect.

A sixth aspect of the embodiments of the present application provides a device, where the device includes a processor, and the processor is configured to support the device in performing a corresponding function in the uplink transmission method according to the second aspect. The device may further include a memory, and the memory is configured to be coupled to the processor and store a program instruction and data that are necessary for the device. The device may further include a communications interface, configured to perform communication between the device and another device or a communications network.

A seventh aspect of the embodiments of the present application provides a device, where the device includes a processor, and the processor is configured to support the device in performing a corresponding function in the uplink transmission method according to the third aspect. The device may further include a memory, and the memory is configured to be coupled to the processor and store a program instruction and data that are necessary for the device. The device may further include a communications interface, configured to perform communication between the device and another device or a communications network.

An eighth aspect of the embodiments of the present application provides a computer storage medium, configured to store a computer software instruction used by the device according to the sixth aspect. The computer software instruction includes a program designed for executing the foregoing aspect.

A ninth aspect of the embodiments of the present application provides a computer storage medium, configured to store a computer software instruction used by the device according to the seventh aspect. The computer software instruction includes a program designed for executing the foregoing aspect.

A tenth aspect of the embodiments of the present application provides a communications system, including the first device according to the fifth aspect and/or the second device according to the sixth aspect.

The solutions provided in the present application can resolve a problem that when uplink transmission is performed on a heterogeneous network, a transmit end device cannot correctly and effectively send VLC MAC information to a receive end device by using another link.

These and other aspects of the present application are more concise and comprehensible in description of the following embodiments.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
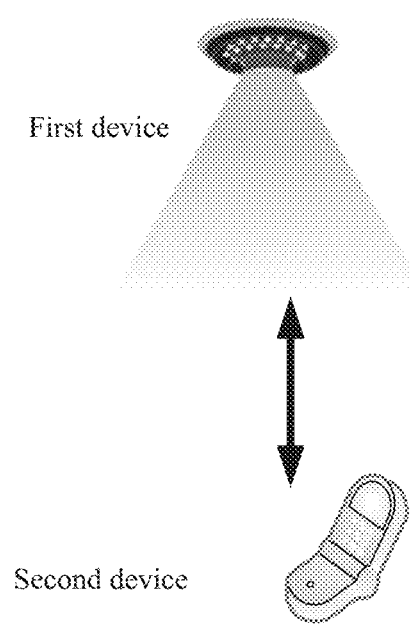
FIG. 1 is a schematic diagram of a communications system according to an embodiment of the present application.

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of the present application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

For ease of understanding by a person skilled in the art, the following explains some terms in this application.

(1) A first device and a second device are devices that can perform visible light communication. For example, the devices may be terminals. The terminal, also referred to as user equipment (UE), is a device providing voice and/or data connectivity for a user, such as a handheld device or a vehicular device that has a visible light communication function. A common terminal includes, for example, a mobile phone, a tablet computer, a notebook computer, a palmtop computer, a mobile internet device (MID), or a wearable device such as a smart watch, a smart band, or a pedometer. For another example, the devices may be VLC access points (AP) that are master nodes on a visible light communication personal area network (VPAN), providing network access for a terminal on the VPAN, and managing and maintaining running of the VPAN. A terminal is connected to a network by accessing an AP. Usually, the VLC AP is acted by a light emitting diode (LED) light on a ceiling. For still another example, the devices may also be radio access network (RAN) devices that have a visible light communication function and that on an access network side of a cellular network. The so-called RAN device is a device that makes a terminal access a radio network and the RAN device includes but is not limited to: an evolved NodeB (eNB), a radio network controller (RNC), a NodeB (NB), a base station controller (BSC), a base transceiver station (BTS), a home base station (such as a Home evolved NodeB (HeNB) or a Home NodeB(HNB)), or a baseband unit (BBU). For yet another example, the devices may also be global controllers (Global CCo). The Global CCo is a global control node that is connected to APs of VPANs by using wired connection links and is responsible for coordinating and managing running of the VPANs together.

(2) MAC layer: A MAC layer in the embodiments of the present application is a VLC MAC layer, including a data plane and a management plane. The data plane of the MAC layer is responsible for performing MAC framing on service data delivered from a higher layer and splitting a MAC frame submitted by a physical layer. The management plane of the MAC layer is responsible for generating various MAC layer command frames, recognizing a command frame received by the MAC layer, and performing a corresponding processing action according to a MAC layer command frame.

(3) An adjacent higher layer of a MAC layer is an abstract layer in the IEEE 1905.1 standard. The abstract layer shields a specific technology used by a bottom layer (a MAC layer and a PHY layer) against a higher layer (an LLC layer or a protocol layer above the LLC layer), so that, from a perspective of the higher layer, it seems that only one technology is used at the bottom layer. Therefore, regardless of which application is used by a higher layer application of a device or which technology (technologies) is supported by a bottom layer of the device, the abstract layer can always choose a suitable port for transmitting a data packet. A reference layer of the adjacent higher layer of the MAC layer is the MAC layer. The MAC layer and the adjacent higher layer of the MAC layer can interact with each other. In some scenarios, the MAC layer cannot interact with another higher layer by using a primitive.

(4) MAC information is information generated by a MAC layer, such as, an ACK frame generated by a data plane of the MAC layer, a command frame generated by a management plane of the MAC layer, or other information generated by the MAC layer.

(5) An adjacent higher layer message is an abstract-layer management message customized by a manufacturer and is used to carry MAC information submitted, by using a primitive, by a MAC layer, and prescribe a processing action performed by an adjacent higher layer of a receive end device after the adjacent higher layer receives the management message. In this way, the processing action performed, after the message is received, by the adjacent higher layer of the device that receives the message is determined, and a problem of uncertainty of the processing action performed by the adjacent higher layer of the receive end device is avoided.

(6) A primitive is a parameter set exchanged when two adjacent layers in a protocol stack are performing interaction. In the parameter set, there is necessary information provided by one party for the other party of the interaction. In addition to a parameter, each primitive further strictly prescribes a generation condition of the primitive, an objective of primitive interaction, a processing action performed after the other party receives the primitive, and the like. An entire service primitive includes a name, a type, and a parameter. In addition, the primitive further needs to prescribe an occasion on which the primitive is generated, a function of the primitive, and an action performed after the primitive is received.

(7) "A plurality of" means two or more. "And/Or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application in detail with reference to the accompanying drawings.

Referring to FIG. 1, FIG. 1 is a schematic diagram of a communications system disclosed in an embodiment of the present application. The communications system shown in FIG. 1 includes a first device 110 and a second device 120. A MAC layer of the first device 110 generates MAC information, then generates a first primitive carrying the MAC information, and sends the first primitive to an adjacent higher layer of the MAC layer of the first device 110. The adjacent higher layer of the MAC layer of the first device 110 receives the first primitive, then generates an adjacent higher layer message carrying the MAC information, and sends the adjacent higher layer message to an adjacent higher layer of a MAC layer of the second device 120. The adjacent higher layer of the MAC layer of the second device 120 receives the adjacent higher layer message, and then generates a second primitive carrying the MAC information. Finally, the adjacent higher layer of the MAC layer of the second device 120 sends the second primitive to the MAC layer of the second device 120. In this way, a problem that when uplink transmission is performed on a heterogeneous network, a transmit end device cannot correctly and effectively send a VLC MAC frame to a receive end device by using another link is resolved.

Figure 2:
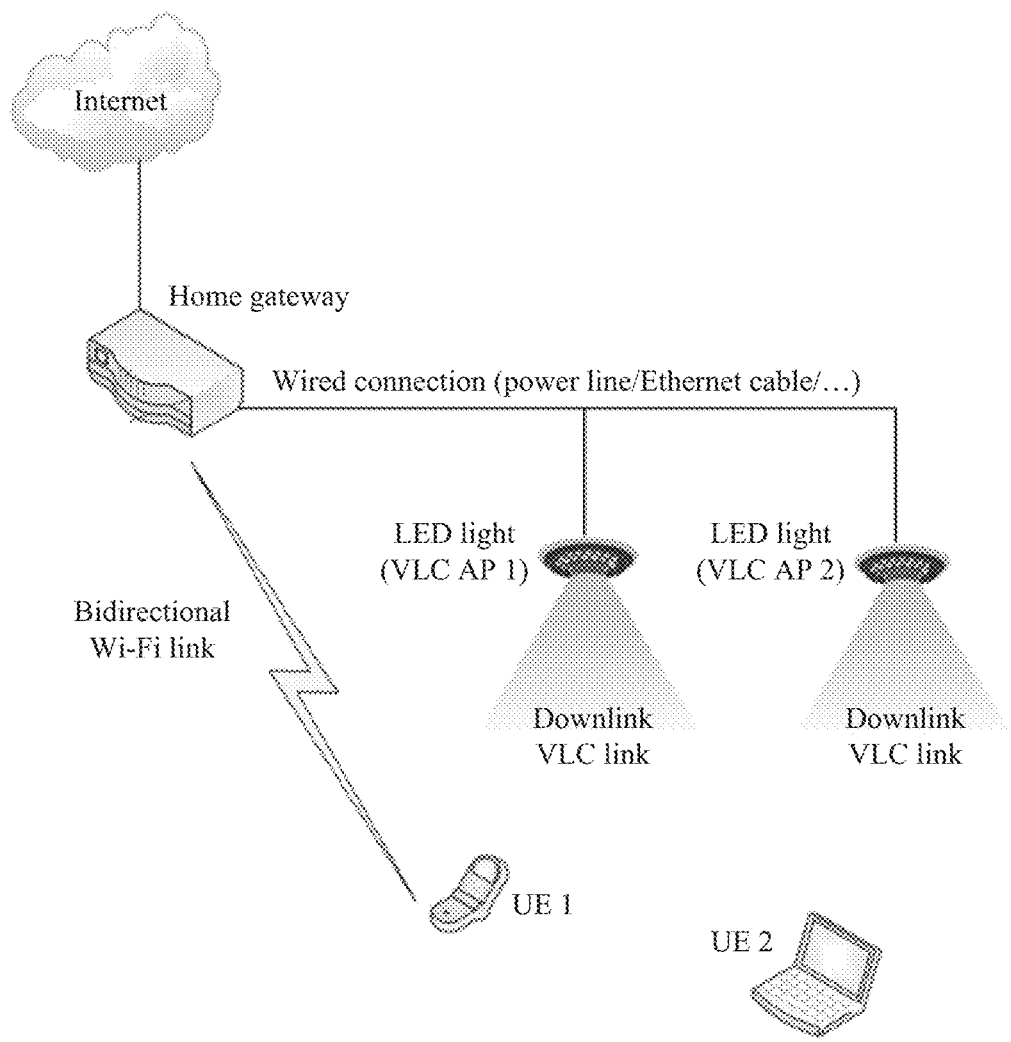
FIG. 2 is a downlink VLC+RF heterogeneous network according to an embodiment of the present application.
Figure 3:
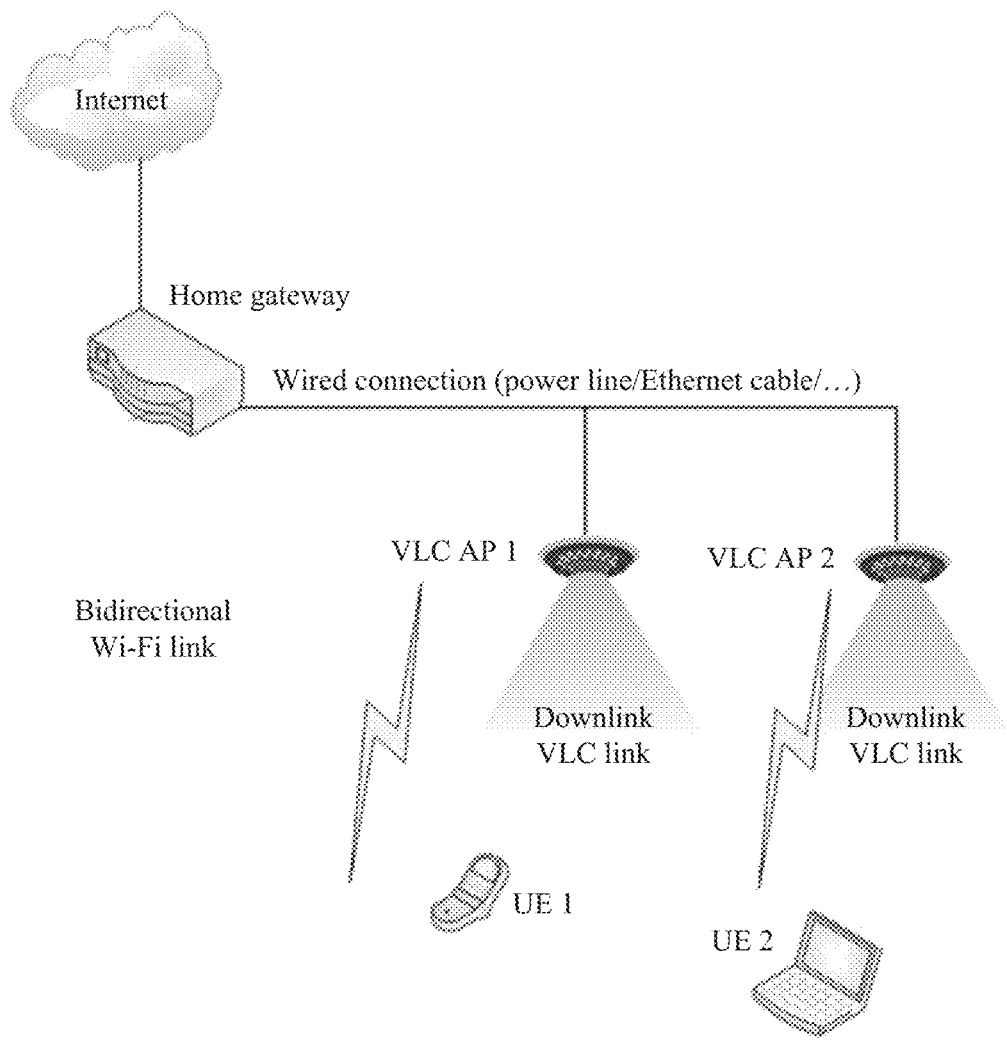
FIG. 3 is another downlink VLC+RF heterogeneous network according to an embodiment of the present application.

This application is applicable to any network on which a visible light communication technology is used, such as, a downlink VLC+uplink RF heterogeneous network shown in FIG. 2 or a downlink VLC+uplink RF heterogeneous network shown in FIG. 3. Assuming that the first device 110 is a terminal (including UE1 and UE2) and the second device 120 is a VLC AP (including VLC AP1 and VLC AP2) on the heterogeneous networks shown in FIG. 2 and FIG. 3, a Wi-Fi link may be used for both uplink and downlink or a Wi-Fi uplink may be used only for uplink on the heterogeneous networks shown in FIG. 2 and FIG. 3. This is not specifically limited. That is, this application is concerned with only a case in which a VLC link is used only for downlink but not concerned with whether a Wi-Fi link is used for both uplink and downlink. In addition, wired connection that connects a gateway and an LED light may be in any one of the following wired connection forms: power line communication (PLC), Ethernet, telephone line, coaxial cable, optical fiber, or the like. This is not specifically limited in this application. The PLC is used as an example for detailed description in this application. A difference between FIG. 3 and FIG. 2 is as follows: A Wi-Fi AP in FIG. 2 is located at a gateway, and when a terminal needs to send MAC information (such as an ACK frame or a command frame) to a VLC AP, the MAC information needs to be first sent to the gateway by using a Wi-Fi link, and the gateway then sends the MAC information to the VLC AP by using a PLC link. However, both a Wi-Fi AP and a VLC AP in FIG. 3 are located at an LED light, that is, the LED light not only has a PLC port and a VLC port but also has a Wi-Fi port. Therefore, when a terminal needs to send MAC information to the VLC AP, the MAC information can be directly sent to the VLC AP by using a Wi-Fi link without participation of a PLC link.

For ease of understanding by a person skilled in the art, the following describes the embodiments of the present application in detail with reference to the accompanying drawings.

Figure 4:
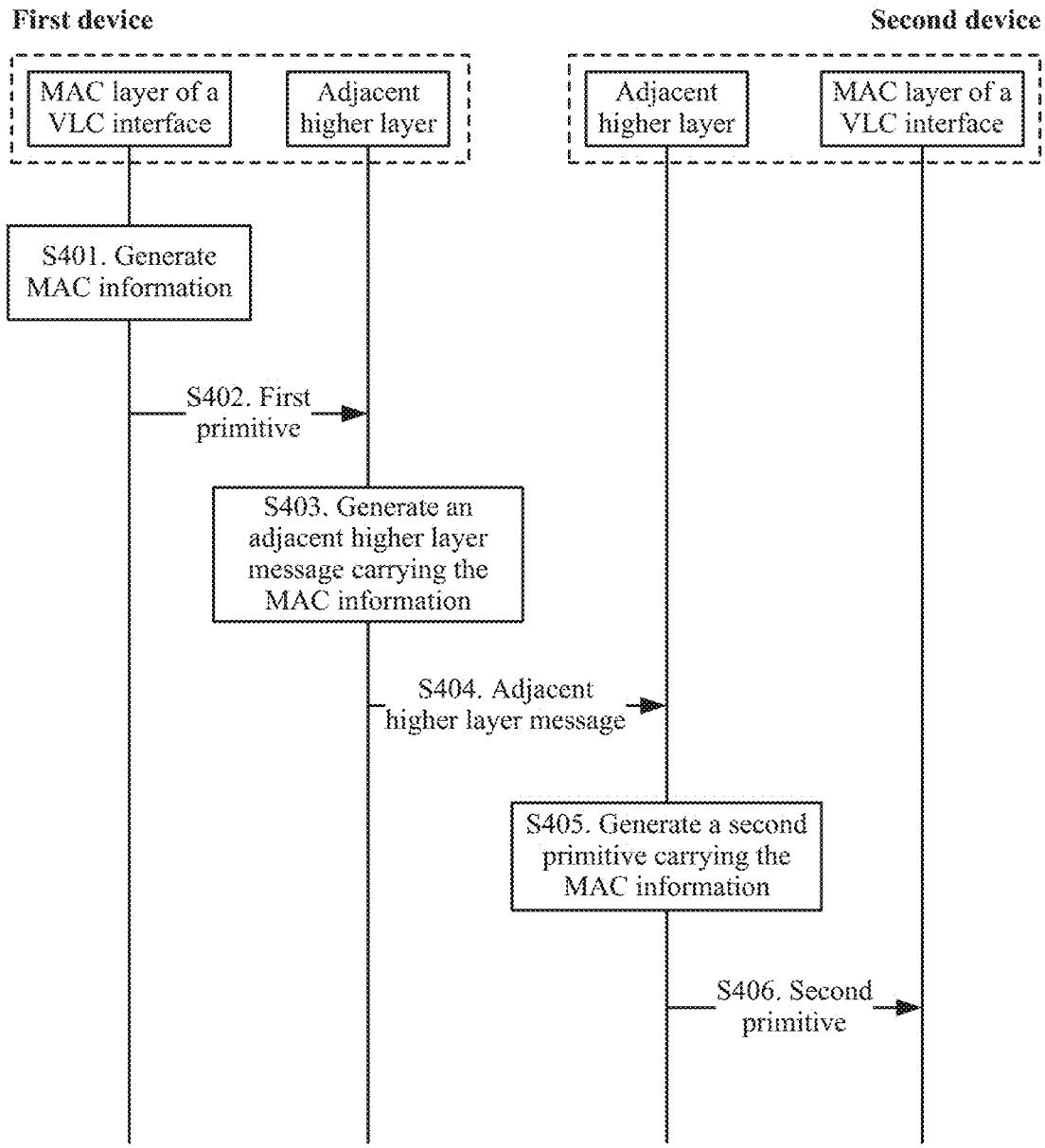
FIG. 4 is a schematic flowchart of an uplink transmission method according to an embodiment of the present application.

As shown in FIG. 4, an uplink transmission method provided in an embodiment of the present application includes the following steps.

S401. A MAC layer of a first device generates MAC information.

S402. The first device generates a first primitive carrying the foregoing MAC information, and sends the foregoing first primitive to an adjacent higher layer of the MAC layer of the first device.

S403. The adjacent higher layer of the MAC layer of the first device receives the first primitive, and generates an adjacent higher layer message carrying the foregoing MAC information.

S404. The adjacent higher layer of the MAC layer of the first device sends the foregoing adjacent higher layer message to an adjacent higher layer of a MAC layer of a second device.

S405. The adjacent higher layer of the MAC layer of the second device receives the foregoing adjacent higher layer message, and generates a second primitive carrying the foregoing MAC information.

S406. The adjacent higher layer of the MAC layer of the second device sends the foregoing second primitive to the MAC layer of the second device.

In step S401, the MAC information generated by the MAC layer of the first device may be an ACK frame or a command frame.

The first primitive that is generated in step S402 and that carries the foregoing MAC information is a MAC layer data indication primitive MLME-DATA.indication. The primitive is used to instruct the adjacent higher layer of the MAC layer of the first device to send the foregoing MAC information to the adjacent higher layer of the MAC layer of the second device. It should be noted that, usually, a primitive that starts with MLME is a MAC layer management plane primitive, while an English name of the first primitive is also defined as a primitive starting with MLME in this embodiment of this application; however, this does not indicate that the first primitive is necessarily a MAC layer management plane primitive. The first primitive may also be a MAC layer data plane primitive, for example, that the English name of the first primitive is defined as MCPS-DATA.indication also falls within the protection scope of this application. The primitive MLME-DATA.indication includes at least the following parameters: address information of the first device, address information of the second device, and an MSDU (such as an ACK frame or a command frame). The foregoing address information of the first device is a source address which may be a VLC MAC address of the first device or an adjacent higher layer address of the first device plus an indicator used to indicate a VLC port. This is not limited in this application. The foregoing address information of the second device is a destination address which may be a VLC MAC address of the second device or an adjacent higher layer address of the second device plus an indicator used to indicate a VLC port. This is not limited in this application. In this application, the source address is used as an example to describe the address information of the first device in detail and the destination address is used as an example to describe the address information of the second device in detail. The primitive MLME-DATA.indication may further include another parameter, and this is not limited in this application. Description about parameters included in the primitive MLME-DATA.indication is shown in Table 1. The first primitive is generated after the MAC layer of the first device generates the MAC information and when the MAC information needs to be sent to the second device by the adjacent higher layer. After receiving the first primitive, the adjacent higher layer needs to generate an adjacent higher layer message, and encapsulate parameters such as the source address, the destination address, and the MSDU that are in the first primitive as payload of the message.

TABLE 1

Description about parameters in a primitive MLME-DATA.indication

| Parameter Name | Description |
|---|---|
| Source address | EUI-64 address of a VLC port generating this primitive |
| Destination address | EUI-64 address of a VLC port of a peer device that needs to receive an MSDU included in this primitive |
| MSDU | ACK frame or command frame generated by a VLC MAC layer |

Figure 5:
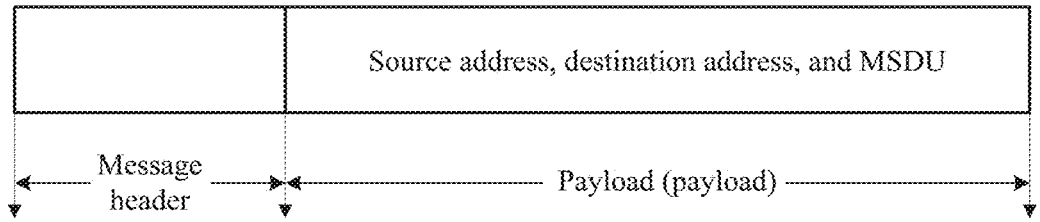
FIG. 5 is a schematic diagram of a format of a message SEND-MAC-MESSAGE.indication according to an embodiment of the embodiment.

In step S403, the adjacent higher layer message that is generated by the adjacent higher layer of the MAC layer of the first device after the adjacent higher layer of the MAC layer of the first device receives the first primitive and that carries the foregoing MAC information is a send-MAC-message indication message SEND-MAC-MESSAGE.indication. The adjacent higher layer message carries the parameters such as the source address, the destination address, and the MSDU that are carried in the primitive MLME-DATA.indication, where the parameters are used as the payload part of the adjacent higher layer message. A format of the message SEND-MAC-MESSAGE.indication is shown in FIG. 5. Description about parameters in the message SEND-MAC-MESSAGE.indication is shown in Table 2.

TABLE 2

Format of a message SEND-MAC-MESSAGE.indication

| Field | Length | Value Range | Description |
|---|---|---|---|
| Destination address | 6 octets | Any EUI-48 address | Abstract layer address of a receive end device that receives this message |
| Source address | 6 octets | Any EUI-48 address | Abstract layer address of a device that generates this message |
| Ethertype | 2 octets | 0x893A | Ethertype for the 1905.1 standard |
| Message version | 1 octet | 0x00 | Standard version followed by this message |
| Reserved | 1 octet | | Reserved field |
| Message type | 2 octets | | Message type |
| Message ID | 2 octets | | ID that identifies this message |
| Fragment ID | 1 octet | | |
| Last fragment indicator | 1 bit (a highest bit of the octet) | | Indicating whether payload carried in this message is a last Ethernet frame fragment: "0" indicates the payload is not the last fragment; and "1" indicates the payload is the last fragment |
| Relay indicator | 1 bit (a next-highest bit of the octet) | | Indicating whether an abstract layer that receives this message needs relaying: "0" indicates relaying is skipped; "1" indicates relaying is needed; and the bit in this message needs to be set to "1" |
| Reserved | 6 bits (rest 6 bits of the octet) | | Reserved field |
| Source address TLV | 11 octets | | Information about a source address carried in a primitive MLME-DATA.indication. For a specific format, refer to Table 3 |
| Destination address TLV | 11 octets | | Information about a destination address carried in the primitive MLME-DATA.indication. For a specific format is referred to Table 4 |
| MAC information TLV | Variable | | MSDU carried in the primitive MLME-DATA.indication. For a specific format. refer to Table 5 |
| Message-end TLV | 3 octets | | TLV used to indicate that this management message ends |

A format of the source address TLV in Table 2 is shown in Table 3.

TABLE 3

Format of a source address TLV

| Field | Length | Value | Description |
|---|---|---|---|
| TLV type | 1 octet | 11 | Indicating that the TLV is a TLV customized by a manufacturer |
| TLV length | 2 octets | | Quantity of octets included in a subsequent field |
| TLV value | 3 octets | | Manufacturer OUI |
| | 11 octets | | EUI-64 source address carried in a primitive MLME-DATA.indication. For a specific format, refer to the following table: |

| Field | Length | Description |
|---|---|---|
| TLV type | 1 octet | TLV type is customized and assigned by the manufacturer |
| TLV length | 2 octets | Quantity of octets included in a subsequent field |
| TLV value | 8 octets | EUI-64 source address carried in the primitive MLME-DATA.indication |

A format of the destination address TLV in Table 2 is shown in Table 4.

TABLE 4

Format of a destination address TLV

| Field | Length | Value | Description |
|---|---|---|---|
| TLV type | 1 octet | 11 | Indicating that the TLV is a TLV customized by a manufacturer |
| TLV length | 2 octets | | Quantity of octets included in a subsequent field |
| TLV value | 3 octets | | Manufacturer OUI |
| | 11 octets | | EUI-64 destination address carried in a primitive MLME-DATA.indication. For a specific format, refer to the following table: |

| Field | Length | Description |
|---|---|---|
| TLV type | 1 octet | TLV type is customized and assigned by the manufacturer |
| TLV length | 2 octets | Quantity of octets included in a subsequent field |
| TLV value | 8 octets | EUI-64 destination address carried in the primitive MLME-DATA.indication |

A format of a MAC information TLV in Table 2 is shown in Table 5.

TABLE 5

Format of MAC information TLV

| Field | Length | Value | Description |
|---|---|---|---|
| TLV type | 1 octet | 11 | Indicating that the TLV is a TLV customized by a manufacturer |
| TLV length | 2 octets | | Quantity of octets included in a subsequent field |
| TLV value | 3 octets | | Manufacturer OUI |
| | m octets | | MSDU carried in a primitive MLME-DATA.indication (that is an ACK frame or a command frame of a VLC MAC layer). For a specific format, refer to the following table: |

| Field | Length | Description |
|---|---|---|
| TLV type | 1 octet | TLV type is customized and assigned by the manufacturer |
| TLV length | 2 octets | Quantity of octets included in a subsequent field |
| TLV value | 8 octets | MSDU carried in the primitive MLME-DATA.indication |

In step S404, a specific implementation in which the adjacent higher layer of the MAC layer of the first device sends the foregoing adjacent higher layer message to an adjacent higher layer of a MAC layer of a second device may be as follows: The adjacent higher layer of the MAC layer of the first device sends the adjacent higher layer message to an adjacent higher layer of the MAC layer of the second device by using a designated link. The designated link includes a wired link, an RF link, an IR link, a wired link and an RF link, or a wired link and an IR link. The wired link includes a PLC link, an Ethernet link, an optical fiber link, a coaxial link, a telephone wired link, or the like. The RF link includes a Wi-Fi link, a ZigBee link, a Bluetooth link, an LTE cellular link, an LTE small cell link, or the like. The IR link is an infrared link. For example, in the heterogeneous network shown in FIG. 2, the Wi-Fi AP is located at the gateway; therefore, the adjacent higher layer of the MAC layer of the first device sends the foregoing adjacent higher layer message to the adjacent higher layer of the MAC layer of the second device by using a Wi-Fi link and a PLC link. For another example, in the heterogeneous network shown in FIG. 3, both the Wi-Fi AP and the VLC AP are located at the LED light; therefore, the adjacent higher layer of the MAC layer of the first device may send the foregoing adjacent higher layer message to the adjacent higher layer of the MAC layer of the second device by using a Wi-Fi link directly.

In step S405, after the adjacent higher layer of the MAC layer of the second device receives the foregoing adjacent higher layer message, the adjacent higher layer of the MAC layer of the second device restores the source address, the destination address, and the MSDU from the payload part of the foregoing adjacent higher layer message. The second primitive generated by the adjacent higher layer of the MAC layer of the second device after the adjacent higher layer of the MAC layer of the second device obtains the related parameters in the adjacent higher layer message is a MAC layer data request primitive MLME-DATA.request. The primitive is sent to the MAC layer of the second device, and the primitive carries the source address, the destination address, and the MSDU that are restored from the payload part. The primitive MLME-DATA.request is used by the adjacent higher layer of the MAC layer of the second device to transfer, to the MAC layer of the second device, content of the payload part in the message SEND-MAC-MESSAGE.indication that is received from the first device. The primitive MLME-DATA.request includes at least the following parameters: the source address, the destination address, and the MSDU. The primitive MLME-DATA.request may further include another parameter, and this is not limited in this application. Description about parameters included in the primitive MLME-DATA.request is shown in Table 6. The second primitive is generated after the adjacent higher layer of the MAC layer of the second device receives the foregoing adjacent higher layer message. It should be noted that, usually, a primitive that starts with MLME is a MAC layer management plane primitive, while an English name of the second primitive is also defined as a primitive starting with MLME in this embodiment of this application; however, this does not indicate that the second primitive is necessarily a MAC layer management plane primitive. The second primitive may also be a MAC layer data plane primitive, for example, that the English name of the second primitive is defined as MCPS-DATA.request also falls within the protection scope of this application.

TABLE 6

Description about parameters in a primitive MLME-DATA.request

| Parameter Name | Description |
|---|---|
| Source address | EUI-64 address of a VLC port generating this primitive |
| Destination address | EUI-64 address of a VLC port of a peer device that needs to receive an MSDU included in this primitive |
| MSDU | ACK frame or command frame generated by a VLC MAC layer |

Optionally, after the MAC layer of the second device receives the second primitive sent by the adjacent higher layer of the MAC layer of the second device, the MAC layer of the second device recognizes whether the MSDU included in the primitive MLME-DATA.request is an ACK frame or a command frame. If the MSDU is an ACK frame, a receiving status of the sent MAC frame is determined according to the ACK frame. If the MSDU is a command frame, corresponding processing is performed according to content of the command frame.

Optionally, after the adjacent higher layer of the MAC layer of the first device receives the first primitive in step S403, the adjacent higher layer of the MAC layer of the first device returns a MAC layer data response primitive MLME-DATA.response to the MAC layer of the first device, so as to notify the MAC layer of the first device that the adjacent higher layer of the MAC layer of the first device has received the primitive MLME-DATA.indication.

Optionally, after the adjacent higher layer of the MAC layer of the second device sends the foregoing second primitive to the MAC layer of the second device in step S406, the MAC layer of the second device returns a MAC layer data confirm primitive MLME-DATA.confirm to the adjacent higher layer of the MAC layer of the second device, so as to notify the adjacent higher layer of the MAC layer of the second device that the MAC layer of the second device has received the primitive MLME-DATA.request.

It can be seen that, in this embodiment of the present application, after generating the MAC information, the MAC layer of the first device sends, by using the first primitive, the foregoing MAC information to the adjacent higher layer of the MAC layer of the first device; after generating the adjacent higher layer message carrying the foregoing MAC information, the adjacent higher layer of the MAC layer of the first device sends the foregoing adjacent higher layer message to the adjacent higher layer of the MAC layer of the second device; and the adjacent higher layer of the MAC layer of the second device then sends the foregoing MAC information to the MAC layer of the second device by using the second primitive, thereby resolving a problem that when uplink transmission is performed on a heterogeneous network, a transmit end device cannot correctly and effectively send a VLC MAC frame to a receive end device by using another link.

Figure 6:
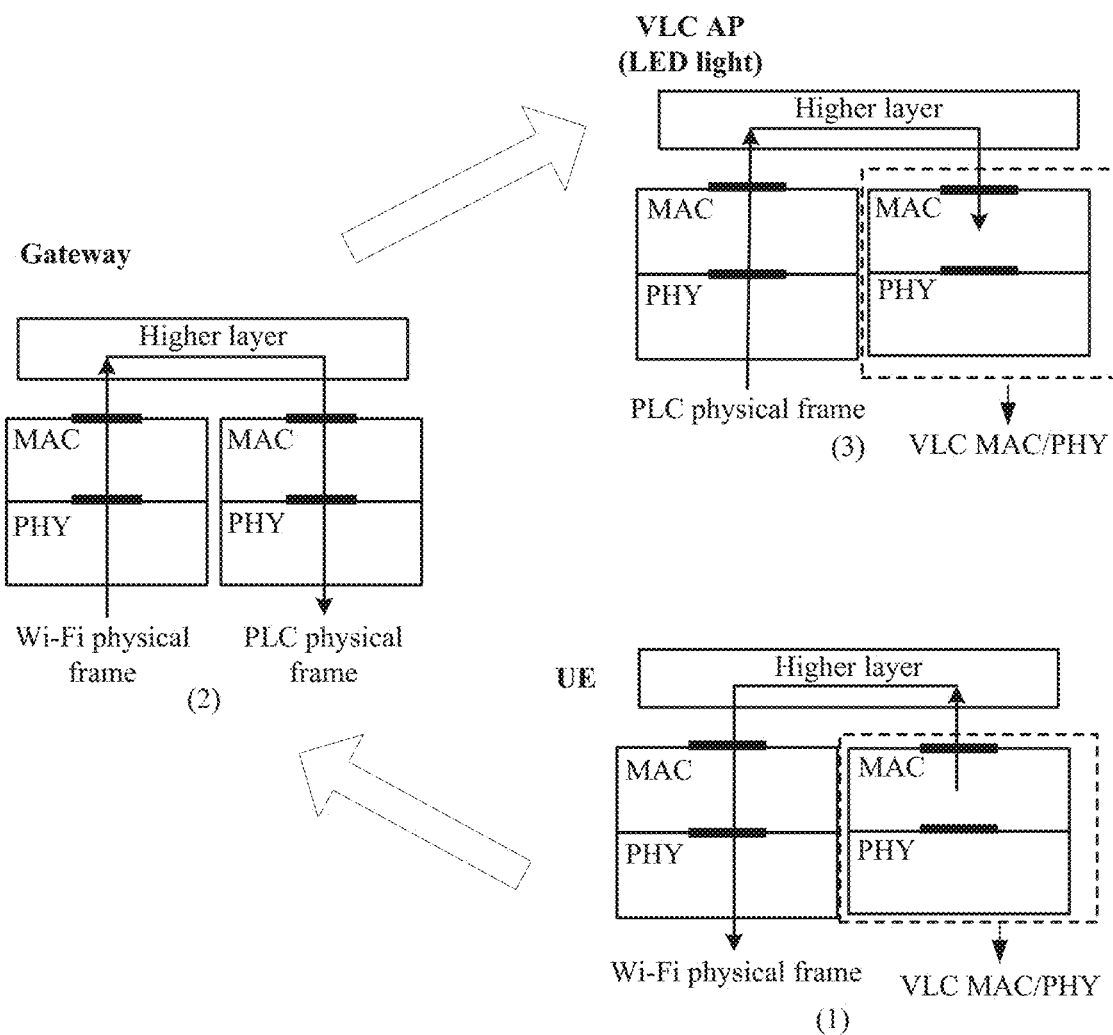
FIG. 6 is a schematic diagram of an uplink transmission process in a heterogeneous system according to an uplink transmission method shown in FIG. 7.
Figure 7:
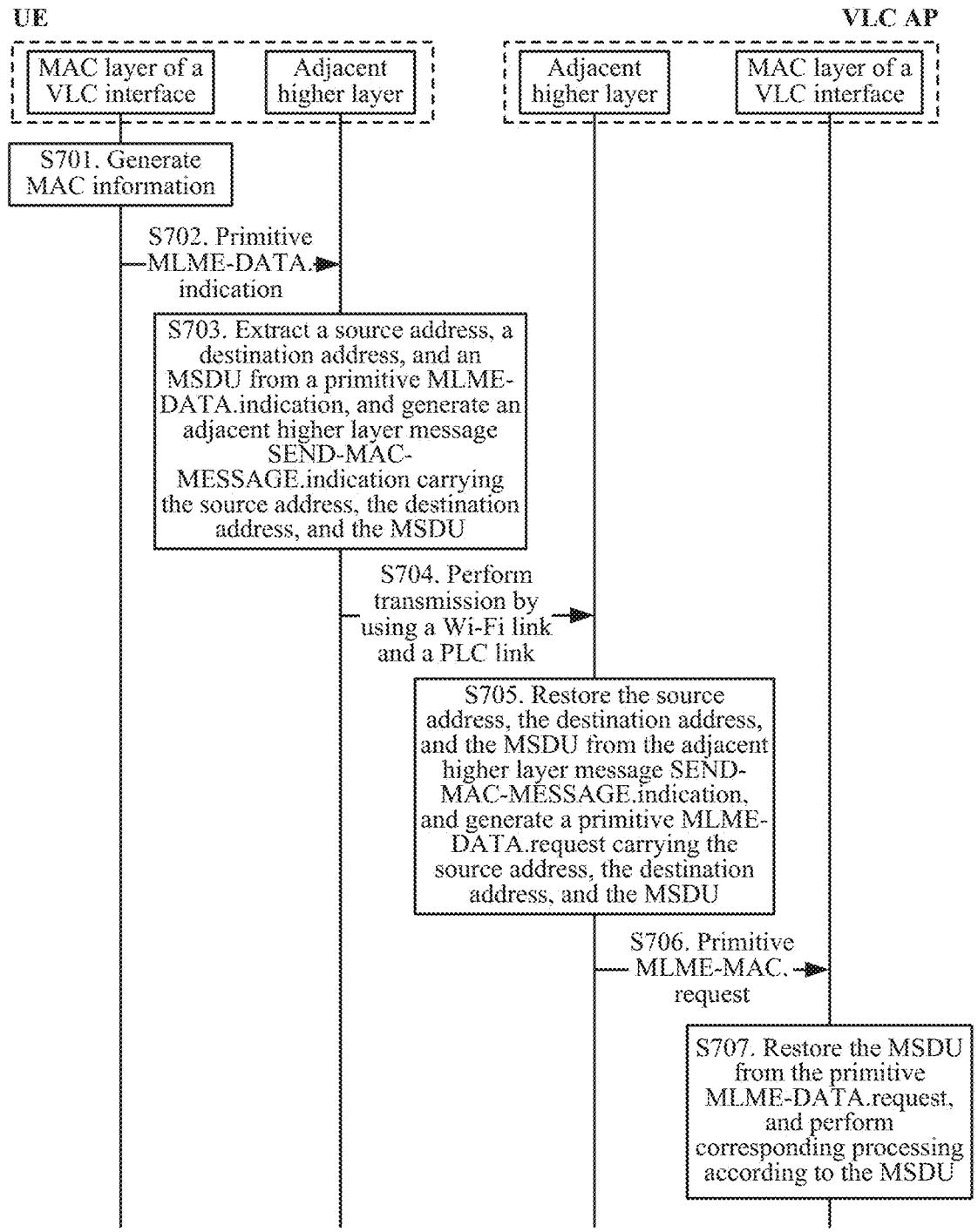
FIG. 7 is a schematic flowchart of an uplink transmission method of the heterogeneous network shown in FIG. 2.

For example, referring to FIG. 6 and FIG. 7, FIG. 7 is a schematic flowchart of an uplink transmission method based on the heterogeneous network shown in FIG. 2, and FIG. 6 is an uplink transmission process in a heterogeneous system according to the uplink transmission method shown in FIG. 7. A first device is UE, a second device is a VLC AP, a MAC layer of the first device is a VLC MAC layer of the UE, and a MAC layer of the second device is a VLC MAC layer of the VLC AP. The method includes the following steps.

S701. The VLC MAC layer of the UE generates MAC information, where the foregoing MAC information includes an ACK frame or a command frame.

S702. The VLC MAC layer of the UE generates a primitive MLME-DATA.indication carrying the foregoing MAC information, and sends the primitive MLME-DATA.indication to an adjacent higher layer of the VLC MAC layer of the UE.

S703. The adjacent higher layer of the VLC MAC layer of the UE extracts a source address, a destination address, and an MSDU from the primitive MLME-DATA.indication, and generates an adjacent higher layer message SEND-MAC-MESSAGE.indication carrying the source address, the destination address, and the MSDU.

S704. The adjacent higher layer of the VLC MAC layer of the UE sends the adjacent higher layer message SEND-MAC-MESSAGE.indication to an adjacent higher layer of the VLC MAC layer of the VLC AP by using a Wi-Fi link and a PLC link.

A specific implementation in which the adjacent higher layer of the VLC MAC layer of the UE sends the adjacent higher layer message SEND-MAC-MESSAGE.indication to an adjacent higher layer of the VLC MAC layer of the VLC AP by using a Wi-Fi link and a PLC link is as follows: The adjacent higher layer of the VLC MAC layer of the UE sends the adjacent higher layer message SEND-MAC-MESSAGE.indication to a gateway by using the Wi-Fi link, and the gateway then sends the adjacent higher layer message SEND-MAC-MESSAGE.indication to the adjacent higher layer of the VLC MAC layer of the VLC AP by using the PLC link.

A specific process of the foregoing implementation is as follows:

(1) The adjacent higher layer of the MAC layer of the UE sends the message SEND-MAC-MESSAGE.indication (for an 802.11 MAC layer, the message SEND-MAC-MESSAGE.indication is an MSDU) to the MAC layer of an 802.11 port by using a primitive MA-UNITDATA.request supported by the 802.11 MAC layer.

(2) The MAC layer of the 802.11 port performs, depending on a processing action to be performed after the primitive MA-UNITDATA.request is received, MAC layer processing on the MSDU, to form an MPDU, and sends, after the processing is completed, the MPDU to a PHY layer of the 802.11 port by using a primitive PHY-DATA.request supported by the PHY layer of the 802.11 port.

(3) The PHY layer of the 802.11 port processes, depending on a processing action to be performed after the primitive PHY-DATA.request is received, the MPDU, to form an 802.11 physical frame, and sends the physical frame onto an 802.11 link by using a transmitter of the PHY layer.

(4) A physical layer of an 802.11 port of a gateway receives the physical frame from the 802.11 link, processes the physical frame depending on a processing action of an 802.11 physical layer, to restore the MPDU, and sends the MPDU to a MAC layer of the 802.11 port by using a primitive PHY-DATA.indication.

(5) The MAC layer of the 802.11 port of the gateway performs, depending on a processing action to be performed after the primitive PHY-DATA.request is received, MAC layer processing on the MPDU, to restore the MSDU, and sends the MSDU to an adjacent higher layer of the MAC layer of the 802.11 port of the gateway by using a primitive MA-UNITDATA.indication.

(6) The adjacent higher layer of the gateway forwards the MSDU to a PLC port of the gateway according to an internal forwarding rule of the adjacent higher layer and the destination address of the message SEND-MAC-MESSAGE.indication, and sends the MSDU to a MAC layer of the PLC port by using a primitive M UNITDATA.request.

(7) The MAC layer of the PLC port of the gateway performs, depending on a processing action to be performed after the primitive M UNITDATA.request is received, MAC layer processing on the MSDU, to form an MPDU, and sends, after the processing is completed, the MPDU to a PHY layer of the PLC port by using a primitive supported by the PHY layer of the PLC port.

(8) The PHY layer of the PLC port processes, depending on a processing action to be performed after the primitive is received, the MPDU, to form a PLC physical frame, and sends the physical frame onto a PLC link by using a transmitter of the PHY layer.

(9) A physical layer of a PLC port of the VLC AP receives the physical frame from the PLC link, processes the physical frame depending on a processing action of a PLC physical layer, to restore the MPDU, and sends the MPDU to a MAC layer of the PLC port by using a primitive.

(10) The MAC layer of the PLC port of the VLC AP performs, depending on a processing action to be performed after the primitive is received, MAC layer processing on the MPDU, to restore the MSDU, and sends the MSDU to an adjacent higher layer of the MAC layer of the PLC port of the VLC AP by using a primitive M UNITDATA.indication.

The MSDU submitted by the MAC layer of the PLC port by using the primitive is an adjacent higher layer message SEND-MAC-MESSAGE.indication newly defined by the adjacent higher layer; therefore, after receiving the adjacent higher layer message, the adjacent higher layer of the MAC layer of the VLC AP can recognize this message.

S705. The adjacent higher layer of the VLC MAC layer of the VLC AP receives the adjacent higher layer message SEND-MAC-MESSAGE.indication, restores the source address, the destination address, and the MSDU from the adjacent higher layer message SEND-MAC-MESSAGE.indication, and generates a primitive MLME-DATA.request carrying the source address, the destination address, and the MSDU.

The adjacent higher layer of the VLC MAC layer of the VLC AP can determine, according to the destination MAC address, that the MSDU carried in the message needs to be sent to the VLC MAC layer of the VLC AP (but not to a PLC MAC layer of the VLC AP or to a higher layer).

S706. The adjacent higher layer of the VLC MAC layer of the VLC AP sends the primitive MLME-DATA.request to the VLC MAC layer of the VLC AP.

S707. The VLC MAC layer of the VLC AP restores the MSDU from the primitive MLME-DATA.request, and performs corresponding processing according to the MSDU.

Figure 8:
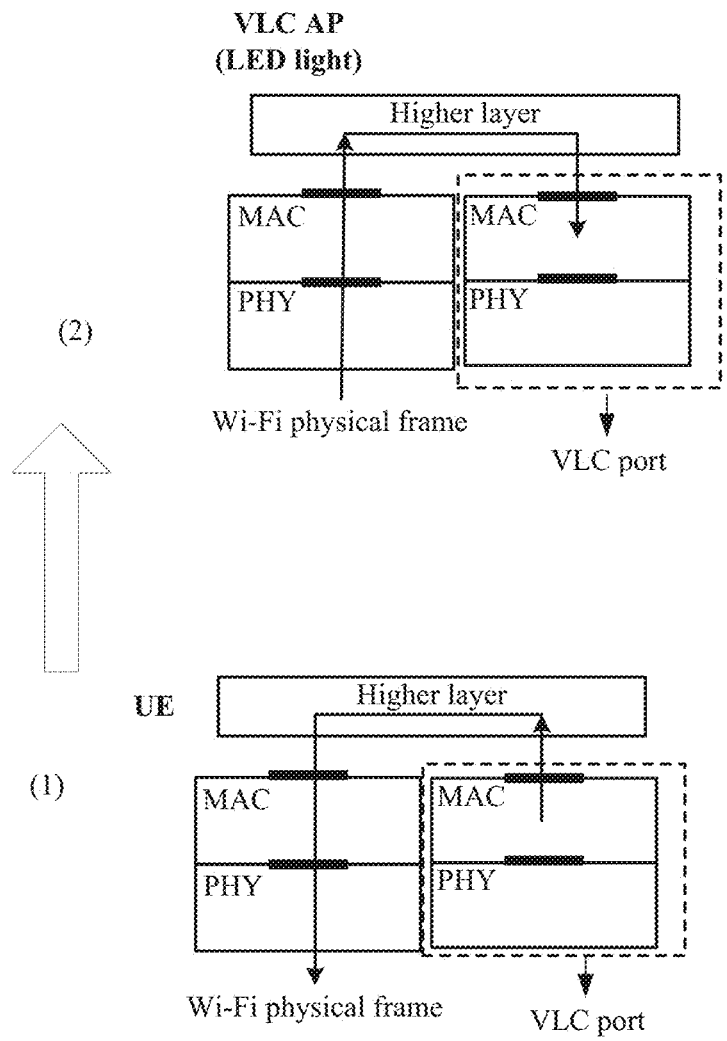
FIG. 8 is a schematic diagram of an uplink transmission process in a heterogeneous system according to an uplink transmission method shown in FIG. 9.
Figure 9:
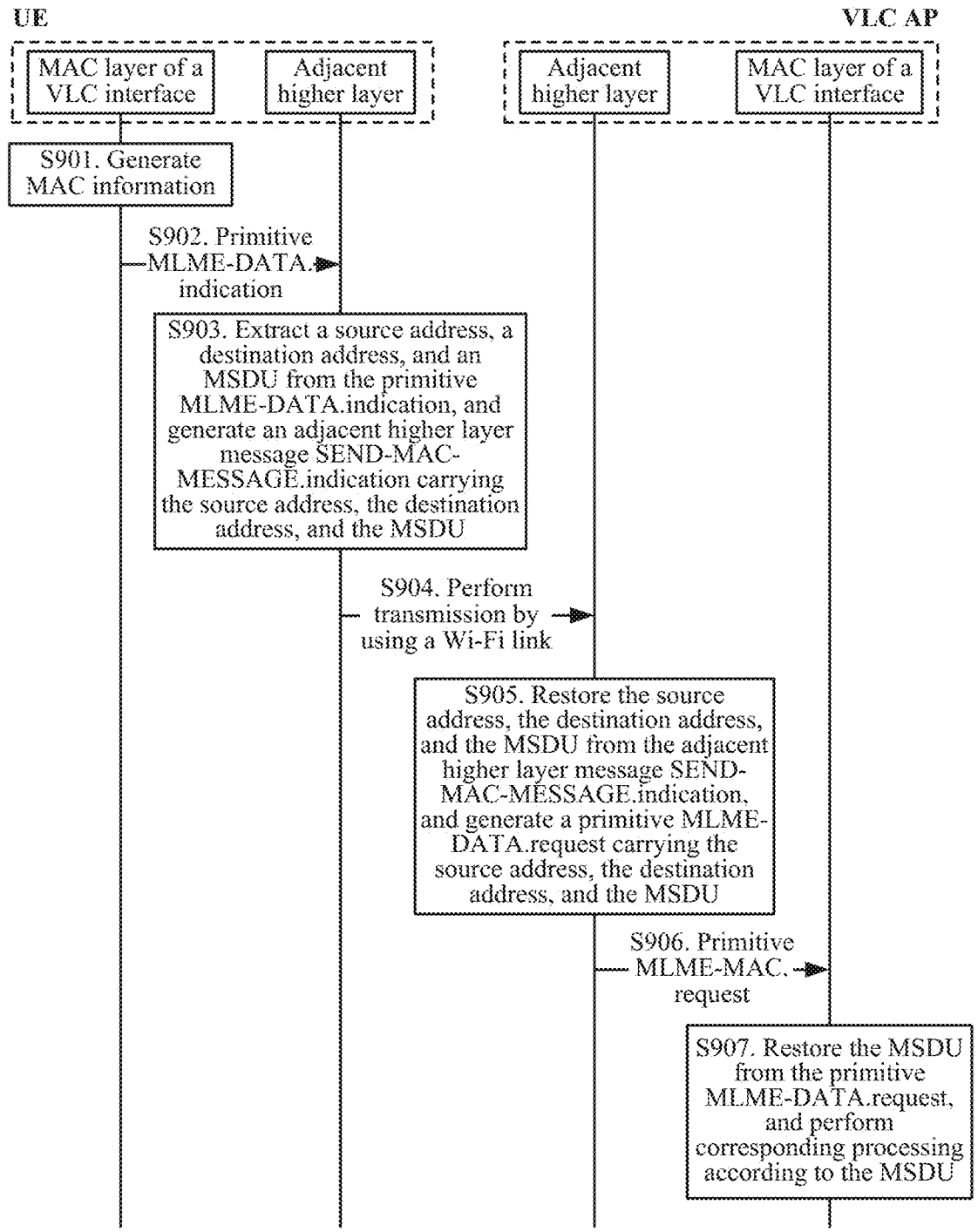
FIG. 9 is a schematic flowchart of an uplink transmission method of the heterogeneous network shown in FIG. 3.

For another example, referring to FIG. 8 and FIG. 9, FIG. 9 is a schematic flowchart of an uplink transmission method based on the heterogeneous network shown in FIG. 3, and FIG. 8 is an uplink transmission process in a heterogeneous system according to the uplink transmission method shown in FIG. 9. A first device is UE, a second device is a VLC AP, a MAC layer of the first device is a VLC MAC layer of the UE, and a MAC layer of the second device is a VLC MAC layer of the VLC AP. The method includes the following steps.

S901. The VLC MAC layer of the UE generates MAC information, where the foregoing MAC information includes an ACK frame or a command frame.

S902. The VLC MAC layer of the UE generates a primitive MLME-DATA.indication carrying the foregoing MAC information, and sends the primitive MLME-DATA.indication to an adjacent higher layer of the VLC MAC layer of the UE.

S903. The adjacent higher layer of the VLC MAC layer of the UE extracts a source address, a destination address, and an MSDU from the primitive MLME-DATA.indication, and generates an adjacent higher layer message SEND-MAC-MESSAGE.indication carrying the source address, the destination address, and the MSDU.

S904. The adjacent higher layer of the VLC MAC layer of the UE sends the adjacent higher layer message SEND-MAC-MESSAGE.indication to an adjacent higher layer of the VLC MAC layer of the VLC AP by using a Wi-Fi link.

A specific implementation in which the adjacent higher layer of the VLC MAC layer of the UE sends the adjacent higher layer message SEND-MAC-MESSAGE.indication to an adjacent higher layer of the VLC MAC layer of the VLC AP by using aWi-Fi link is as follows: The adjacent higher layer of the VLC MAC layer of the UE sends the adjacent higher layer message SEND-MAC-MESSAGE.indication to a Wi-Fi port of the VLC AP by using a Wi-Fi link, and the Wi-Fi port of the VLC AP restores the message SEND-MAC-MESSAGE.indication, and sends the message SEND-MAC-MESSAGE.indication to the adjacent higher layer of the VLC MAC layer of the VLC AP.

A specific process of the foregoing implementation is as follows:

(1) The adjacent higher layer of the UE sends the message SEND-MAC-MESSAGE.indication (for a MAC layer, the message SEND-MAC-MESSAGE.indication is an MSDU) to a MAC layer of an 802.11 port by using a primitive MA-UNITDATA.request supported by an 802.11 MAC layer.

(2) The MAC layer of the 802.11 port performs, depending on a processing action to be performed after the primitive MA-UNITDATA.request is received, MAC layer processing on the MSDU, to form an MPDU, and sends, after the processing is completed, the MPDU to a PHY layer of the 802.11 port by using a primitive PHY-DATA.request supported by the PHY layer of the 802.11 port.

(3) The PHY layer of the 802.11 port processes, depending on a processing action to be performed after the primitive PHY-DATA.request is received, the MPDU, to form an 802.11 physical frame, and sends the physical frame onto an 802.11 link by using a transmitter of the PHY layer.

(4) A physical layer of an 802.11 port of the VLC AP receives the physical frame from the 802.11 link, processes the physical frame depending on a processing action of an 802.11 physical layer, to restore the MPDU, and sends the MPDU to a MAC layer of the 802.11 port by using a primitive PHY-DATA.indication.

(5) The MAC layer of the 802.11 port of the VLC AP performs, depending on a processing action to be performed after the primitive PHY-DATA.request is received, MAC layer processing on the MPDU, to restore the MSDU, and sends the MSDU to an adjacent higher layer of the MAC layer of the 802.11 port of the gateway by using a primitive MA-UNITDATA.indication.

The MSDU submitted by the MAC layer of the 802.11 port by using the primitive is a management message SEND-MAC-MESSAGE.indication newly defined by the adjacent higher layer; therefore, after receiving the management message, the adjacent higher layer of the VLC AP can recognize this message.

S905. The adjacent higher layer of the VLC MAC layer of the VLC AP receives the adjacent higher layer message SEND-MAC-MESSAGE.indication, restores the source address, the destination address, and the MSDU from the adjacent higher layer message SEND-MAC-MESSAGE.indication, and generates a primitive MLME-DATA.request carrying the source address, the destination address, and the MSDU.

S906. The adjacent higher layer of the VLC MAC layer of the VLC AP sends the primitive MLME-DATA.request to the VLC MAC layer of the VLC AP.

S907. The VLC MAC layer of the VLC AP restores the MSDU from the primitive MLME-DATA.request, and performs corresponding processing according to the MSDU.

With reference to the accompany drawings, the following describes an apparatus configured to implement the foregoing methods according to this embodiment of the present application.

Figure 10:
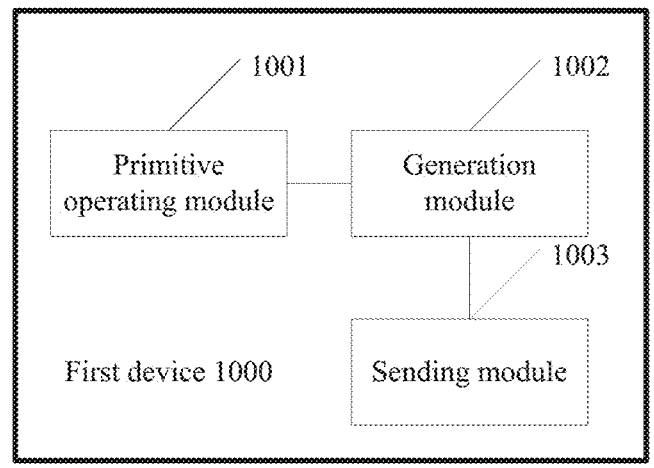
FIG. 10 is a schematic structural diagram of a second device according to an embodiment of the present application.

Referring to FIG. 10, FIG. 10 is a schematic structural diagram of a first device according to an embodiment of the present application.

As shown in FIG. 10, the first device 1000 may include a primitive operating module 1001, a generation module 1002, and a sending module 1003.

The processing module 1001 is configured to generate, after a media access control MAC layer of the first device generates MAC information, a first primitive carrying the MAC information.

The processing module 1001 is further configured to send the first primitive to an adjacent higher layer of the MAC layer of the first device.

The generation module 1002 is configured to generate, after the adjacent higher layer of the MAC layer of the first device receives the first primitive, an adjacent higher layer message carrying the MAC information.

The sending module 1003 is configured to send the adjacent higher layer message to an adjacent higher layer of a MAC layer of a second device, where the adjacent higher layer message is used to instruct the adjacent higher layer of the MAC layer of the second device to send, by using a second primitive, the MAC information to the MAC layer of the second device.

Optionally, the MAC information includes an acknowledgment ACK frame or a command frame generated by the MAC layer of the first device.

Optionally, the first primitive further carries address information of the second device.

Optionally, the second primitive further carries address information of the first device.

Optionally, the sending module 1003 is specifically configured to:

send the adjacent higher layer message to the adjacent higher layer of the MAC layer of the second device by using a designated link, where the designated link includes a wired link, an RF link, an IR link, a wired link and an RF link, or a wired link and an IR link.

It should be noted that the foregoing modules (the sending module 1001 and the generation module 1002) are configured to perform related steps in the foregoing methods.

In this embodiment, the first device 1000 is presented in a form of module. Herein, the "module" may be an application-specific integrated circuit (ASIC), a processor and a memory that execute one or more pieces of software or firmware programs, an integrated logical circuit, and/or another component that can provide the foregoing functions. In addition, the foregoing sending module 1003 may send information to the second device by using a communications interface between the first device and the second device; and the processing module 1001 and the generation module 1002 may be implemented by using a processor and a memory that are in FIG. 12.

Figure 11:
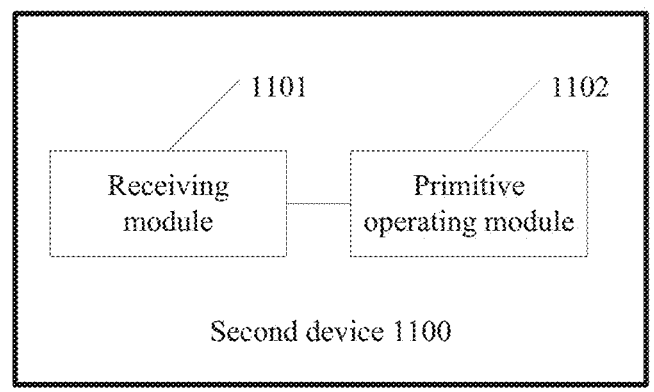
FIG. 11 is a schematic structural diagram of a first device according to an embodiment of the present application.

Referring to FIG. 11, FIG. 11 is a schematic structural diagram of a second device according to an embodiment of the present application.

As shown in FIG. 11, the second device 1100 may include a receiving module 1101 and a primitive operating module 1002.

The receiving module 1101 is configured to receive an adjacent higher layer message sent by an adjacent higher layer of a MAC layer of a first device, where the adjacent higher layer message is a message that is generated by the adjacent higher layer of the MAC layer of the first device after the adjacent higher layer of the MAC layer of the first device receives a first primitive and that carries MAC information.

The processing module 1102 is configured to: generate a second primitive carrying the MAC information, and send the second primitive to a MAC layer of the second device.

Optionally, the first primitive further carries address information of the second device.

Optionally, the second primitive further carries address information of the first device.

It should be noted that the foregoing modules (the receiving module 1101 and the primitive operating module 1102) are configured to perform related steps in the foregoing methods.

In this embodiment, the second device 1100 is presented in a form of module. Herein, the "module" may be an application-specific integrated circuit (ASIC), a processor and a memory that execute one or more pieces of software or firmware programs, an integrated logical circuit, and/or another component that can provide the foregoing functions. In addition, the foregoing receiving module 1101 may receive the information sent by the first device by using a communications interface between the first device and the second device; and the processing module 1102 may be implemented by using a processor and a memory that are in FIG. 12.

Figure 12:
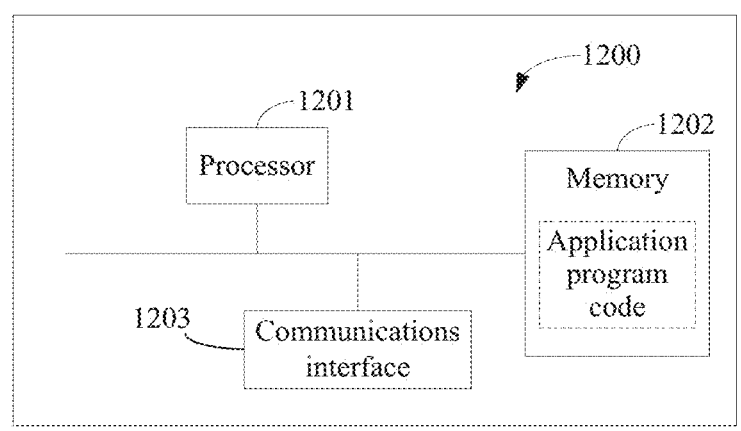
FIG. 12 is a schematic structural diagram of a device according to an embodiment of the present application.

As shown in FIG. 12, the first device 1000 and the second device 1200 may be implemented in a structure in FIG. 12. The device 1200 includes at least one processor 1201, at least one memory 1202, and at least one communications interface 1203. In addition, the device may further include general components such as an antenna, and details are not described herein.

The processor 1201 may be a general central processing unit (CPU), a microprocessor, an application-specific integrated circuit (ASIC), or one or more integrated circuits for controlling execution of the foregoing solution program.

The communications interface 1203 is configured to communicate with another device or a communications network such as an Ethernet, a radio access network (RAN), or a wireless local area network (WLAN).

The memory 1202 may be a read-only memory (ROM) or another type of static storage device that may store static information and instructions, or a random access memory (RAM) or another type of dynamic storage device that may store information and instructions, and may also be an electrically erasable programmable read-only memory (EEPROM), a read-only optical disc (e.g., Compact Disc Read-Only Memory (CD-ROM)), another optical disc storage medium, optical disc storage medium (including a compact disc, a laser disc, an optical disc, a digital versatile disc, a Blu-ray disc, or the like), or magnetic disc storage medium, another magnetic storage device, or any other medium that can be used to carry or store expected program code in a structural form of an instruction or data and that can be accessed by a computer, but is not limited thereto. The memory may exist independently, and is connected to the processor by using a bus. The memory may alternatively be integrated with the processor.

The memory 1202 is configured to store and execute application program code of the foregoing solution, and the processor 1201 controls execution. The processor 1201 is configured to execute the application program code stored in the memory 1202.

When the device shown in FIG. 12 is the first device, the code stored in the memory 1202 may be used to perform the foregoing provided uplink transmission method that is performed by the first device, for example, generating, by a MAC layer of the first device, MAC information, then generating a first primitive carrying the MAC information, and sending the first primitive to an adjacent higher layer of the MAC layer of the first device; and receiving, by the adjacent higher layer of the MAC layer of the first device, the first primitive, then generating an adjacent higher layer message carrying the MAC information, and sending the adjacent higher layer message to an adjacent higher layer of a MAC layer of a second device.

When the device shown in FIG. 12 is the second device, the code stored in the memory 1202 may be used to perform the foregoing provided uplink transmission method that is performed by the second device, for example, receiving, by an adjacent higher layer of a media access control MAC layer of the second device, an adjacent higher layer message sent by an adjacent higher layer of a MAC layer of a first device, generating, by the adjacent higher layer of the MAC layer of the second device, a second primitive carrying the MAC information, and sending the second primitive to the MAC layer of the second device.

An embodiment of the present application further provides a computer storage medium, where the computer storage medium may store a program. When the program is executed, some or all of steps in any uplink transmission method recorded in the foregoing method embodiments are included.

Although the present application is described with reference to the embodiments, in a process of implementing the present application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams.

These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provides steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely examples of the present application defined by the accompanying claims, and is considered as any of or all modifications, variations, combinations or equivalents that cover the scope of the present application. Obviously, a person skilled in the art can make various modifications and variations to the present application without departing from the spirit and scope of the present application. The present application is intended to cover these modifications and variations provided that they fall within the scope of protection defined by the claims of the present application and their equivalent technologies.

What is claimed is:

1. A first device, comprising:
a processor; and
a memory coupled to the processor and storing instructions which, when executed by the processor, cause the first device to:
generate, after a media access control (MAC) layer of the first device generates MAC information, a first primitive carrying the MAC information, the first primitive comprising a MAC layer data indication primitive MLME-DATA.indication including an address information of the first device, an address information of a second device, and an acknowledgement frame or a command frame,
send the first primitive to an adjacent higher layer of the MAC layer of the first device;
generate, after the adjacent higher layer of the MAC layer of the first device receives the first primitive, an adjacent higher layer message carrying the MAC information, and
send the adjacent higher layer message to an adjacent higher layer of a MAC layer of the second device, the adjacent higher layer message for instructing the adjacent higher layer of the MAC layer of the second device to send, by using a second primitive, the MAC information to the MAC layer of the second device.

2. The device according to claim 1, wherein the MAC information comprises the acknowledgment (ACK) frame or the command frame generated by the MAC layer of the first device.

3. The device according to claim 1, wherein the second primitive further carries address information of the first device.

4. The device according to claim 1, wherein the instructions, when executed by the processor, cause the first device to:
send the adjacent higher layer message to the adjacent higher layer of the MAC layer of the second device by using a designated link, wherein the designated link comprises a wired link, a radio frequency (RF) link, an infra-red (IR) link, a wired link and an RF link, or a wired link and an IR link.

5. A second device, comprising:
a processor; and
a memory coupled to the processor and storing instructions which, when executed by the processor cause the second device to:
receive an adjacent higher layer message sent by an adjacent higher layer of a media access control (MAC) layer of a first device, wherein the adjacent higher layer message was generated by the adjacent higher layer of the MAC layer of the first device after the adjacent higher layer of the MAC layer of the first device received a first primitive that carried MAC information, the first primitive comprising a MAC layer data indication primitive MLME-DATA.indication including an address information of the first device, an address information of the second device, and an acknowledgement frame or a command frame, and generate a second primitive carrying the MAC information, and send the second primitive to a MAC layer of the second device.

6. The device according to claim 5, wherein the second primitive further carries address information of the first device.

7. An uplink transmission method, comprising:

generating, by a media access control (MAC) layer of a first device, MAC information, the first primitive comprising a MAC layer data indication primitive MLME-DATA.indication including an address information of the first device, an address information of a second device and an acknowledgement frame or a command frame;

generating a first primitive carrying the generated MAC information;

sending the generated first primitive to an adjacent higher layer of the MAC layer of the first device;

receiving, by the adjacent higher layer of the MAC layer of the first device, the first primitive;

generating an adjacent higher layer message carrying the MAC information; and sending the adjacent higher layer message to an adjacent higher layer of a MAC layer of the second device, the adjacent higher layer message for instructing the adjacent higher layer of the MAC layer of the second device to send, by using a second primitive, the MAC information to the MAC layer of the second device.

8. The method according to claim 7, wherein the MAC information comprises the acknowledgment (ACK) frame or the command frame generated by the MAC layer of the first device.

9. The method according to claim 7, wherein the second primitive further carries address information of the first device.

10. The method according to claim 7, wherein sending, by the adjacent higher layer of the MAC layer of the first device, the adjacent higher layer message to an adjacent higher layer of a MAC layer of the second device comprises:

sending the adjacent higher layer message to the adjacent higher layer of the MAC layer of the second device by using a designated link, wherein the designated link comprises a wired link, a radio frequency (RF) link, an infra-red (IR) link, a wired link and an RF link, or a wired link and an IR link.

11. The method according to claim 7, further comprising:

sending, by the adjacent higher layer of the MAC layer of the second device, the second primitive to the MAC layer of the second device.

* * * * *